US012584819B2

(12) United States Patent
Banasik

(10) Patent No.: US 12,584,819 B2
(45) Date of Patent: Mar. 24, 2026

(54) DRIVE AND METHOD FOR OPERATING A DRIVE

(71) Applicant: SEW-EURODRIVE GMBH & CO. KG, Bruchsal (DE)

(72) Inventor: Lech Banasik, Brighton East (AU)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 539 days.

(21) Appl. No.: 18/007,904

(22) PCT Filed: May 18, 2021

(86) PCT No.: PCT/EP2021/025183
§ 371 (c)(1),
(2) Date: Dec. 2, 2022

(87) PCT Pub. No.: WO2021/244772
PCT Pub. Date: Dec. 9, 2021

(65) Prior Publication Data
US 2023/0228650 A1 Jul. 20, 2023

(30) Foreign Application Priority Data
Jun. 4, 2020 (DE) ........................ 102020003371.7

(51) Int. Cl.
*G01M 13/027* (2019.01)
*G01M 13/021* (2019.01)
*G01M 13/025* (2019.01)

(52) U.S. Cl.
CPC ........ *G01M 13/027* (2013.01); *G01M 13/021* (2013.01); *G01M 13/025* (2013.01)

(58) Field of Classification Search
CPC . G01M 13/021; G01M 13/025; G01M 13/027
See application file for complete search history.

(56) References Cited

U.S. PATENT DOCUMENTS 2,623,384 A 12/1952 Pigott
2005/0063245 A1 3/2005 Wohlrab
2005/0199093 A1 * 9/2005 Schmeink ............ B30B 11/241 74/665 GA (Continued)

FOREIGN PATENT DOCUMENTS

CN 205226316 U 5/2016
CN 107687946 A 2/2018

(Continued)

OTHER PUBLICATIONS

Machine Translation of Kuebler (DE102010017456A1) (Year: 2011).*

(Continued)

*Primary Examiner* — Stephen D Meier
*Assistant Examiner* — Quang X Nguyen
(74) *Attorney, Agent, or Firm* — Carter, DeLuca & Farrell LLP

(57) ABSTRACT

A drive includes an electric motor and a first gearbox that can be driven by the electric motor. An output shaft of the first gearbox is connected rotation-fast to a first shaft by a coupling, e.g., a rigid shaft coupling, and the first shaft is mounted by an axial bearing, e.g., a single axial bearing, that can be subjected to a force by at least one controllable first linear actuator.

23 Claims, 1 Drawing Sheet

(56) References Cited

U.S. PATENT DOCUMENTS

| | | | | |
|---|---|---|---|---|
| 2006/0037402 | A1* | 2/2006 | Musial | G01M 7/00 73/664 |
| 2010/0160104 | A1* | 6/2010 | Dinter | F03D 15/10 475/159 |
| 2011/0023629 | A1 | 2/2011 | Bushey et al. | |
| 2017/0335923 | A1* | 11/2017 | Smith | F16H 57/039 |

FOREIGN PATENT DOCUMENTS

| | | | | |
|---|---|---|---|---|
| CN | 110382917 | A | 10/2019 | |
| DE | 1803541 | U | 1/1960 | |
| DE | 102009058065 | A1 * | 6/2011 | F16H 57/027 |
| DE | 102010017456 | B4 | 1/2017 | |

OTHER PUBLICATIONS

"Lager (Maschinenelement)" Wikipedia, https://de.wikipedia.org/wiki/Lager_(Maschinenelement), version: last edited May 5, 2020, together with English translation from wikipedia, pp. 1-10.

International Search Report issued in corresponding International Application No. PCT/EP2021/025183 dated Sep. 6, 2021, pp. 1-2, English Translation.

International Report on Patentability issued in corresponding International Application No. PCT/EP2021/025183 dated Dec. 6, 2022, pp. 1-9, English Translation.

Chinese Office Action issued by the China National Intellectual Property Administration on Nov. 11, 2025 in corresponding CN Patent Application No. 202180040076.5, with English translation.

* cited by examiner

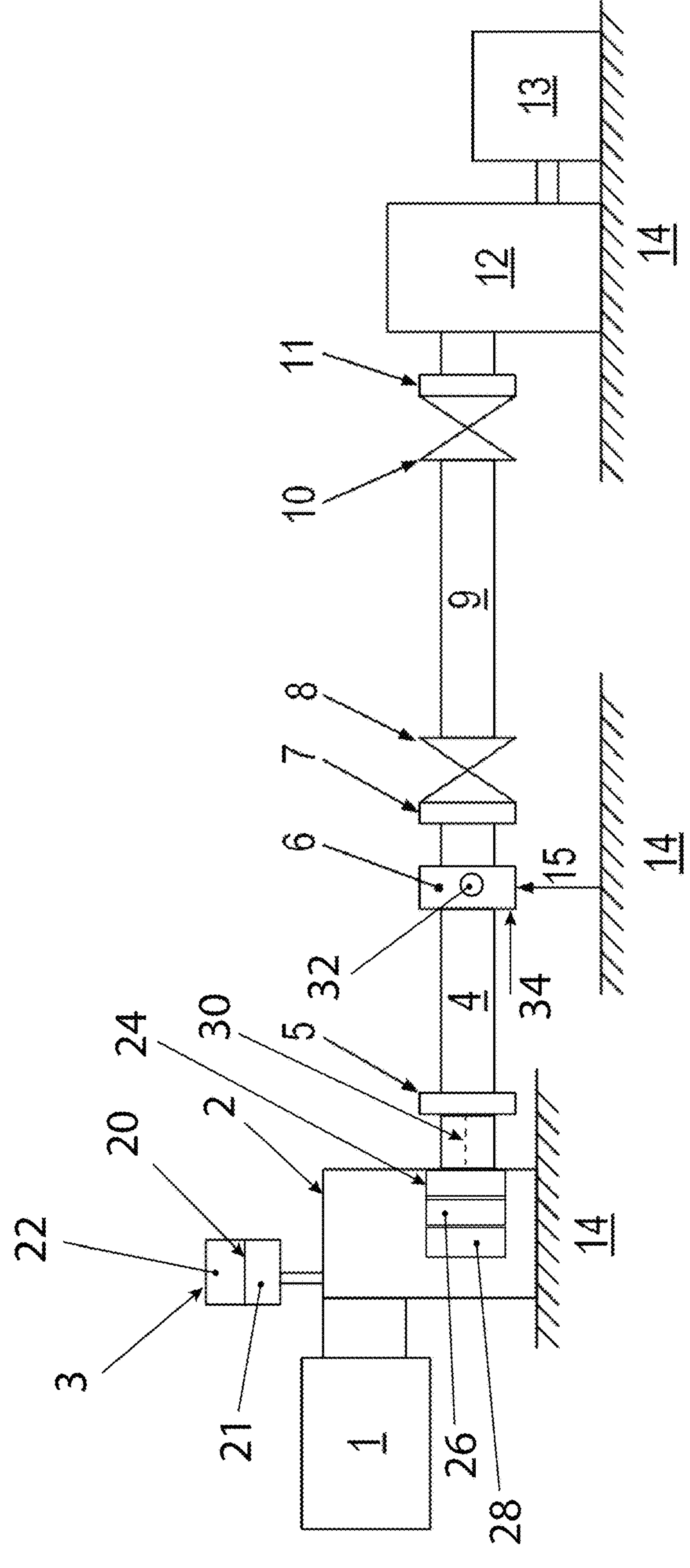
13
12
14
11
10
9
8
7
6
15
14
32
34
4
5
30
24
2
20
22
14
3
21
1
26
28

DRIVE AND METHOD FOR OPERATING A DRIVE

FIELD OF THE INVENTION

The present invention relates to a drive and to a method for operating a drive.

BACKGROUND INFORMATION

In certain conventional systems, a gearbox can be driven by an electric motor.

A loading device is described in German Patent Document No. 10 2010 017 456.

A drive device for an extruder is described in U.S. Patent Application Publication No. 2005/0063245.

A mixer is described in German Patent Document No. 18 03 541.

A bearing and lubricant tester is described in U.S. Pat. No. 2,623,384.

A device for testing a gearbox for lubricant loss is described in Chinese Patent Document No. 107 687 946.

SUMMARY

Example embodiment of the present invention provides for increased safety in a drive.

According to an example embodiment of the present invention, a drive has an electric motor and a first gearbox that can be driven by the electric motor. An output shaft of the first gearbox is connected rotationally-fixed to a first shaft by a coupling, e.g., a rigid shaft coupling, and the first shaft is mounted by an axial bearing, e.g., a single axial bearing, that can be subjected to a force by at least one controllable first linear actuator. Thus, an axial bearing is provided for the first shaft, and an axial force can be assumed by the axial bearing. The first linear actuator can be arranged such that it is supported on the base of an industrial plant, on which base the first gearbox is provided. Alternatively, a different indirect support of the first linear actuator on the housing of the first gearbox is provided or direct support of the linear actuator on the housing of the first gearbox is provided. The first gearbox is also provided with a further axial bearing that rotationally mounts the output shaft and is received in the housing of the first gearbox.

The output shaft can be subjected to a force by the linear actuator, so that the gearbox can be used as a test specimen, in which the oil-tightness of the first gearbox can be checked under load, e.g., by applying transverse force. The first gearbox is filled with oil, and the output shaft can be oriented horizontally. If the test is successful, that is once the test has been passed, the first gearbox is removed and arranged rotated by 90°, where it is driven by a further electric motor. This also does not require complete filling with oil, but rather only partial filling, and no expansion tank is present, either.

For example, the output shaft is connected rotationally-fixed to a first shaft, that is, a shaft mounted outside of the first gearbox. Thus, it is for the bearing, e.g., the outer ring of the axial bearing, to be subjected to a force that is thus supplied to the first shaft via this axial bearing. In this manner, the first gearbox is loaded with a force similar to that also provided in a later application for which the first gearbox is provided.

If the testing of the gearbox is passed, that is, if the gearbox has withstood the load undamaged and with no oil leak, the gearbox is removed and employed in the application. In doing so, the spatial orientation of the gearbox is rotated 90°. For example, the first gearbox is employed in a mixer application, e.g., in a stirrer, in which the output shaft is oriented vertically. Oil must not exit from the gearbox. To reduce the mass of the first gearbox, the first gearbox is filled only partially with oil. The oil level is only high enough for the bearing and the toothed parts engaged with one another to be at least partially lubricated, e.g., the engagement region is below the oil level.

According to example embodiments, the first shaft is connected, e.g., connected rotationally-fixed, to a generator unit via a cardan shaft, e.g., by cardan joints. For example, the generator unit is a generator or a generator that can be driven via a second gear box. Thus, the amount of energy introduced by the electric motor when driving the first gearbox is largely recoverable. In addition, the recovered power can be controlled in broad limits with the generator unit.

According to example embodiments, the first shaft is connected, e.g., rotationally-fixed, at its end region facing away from the first gearbox, using a coupling, e.g., a rigid coupling, to a first cardan joint that at its side facing away from the first shaft is connected, e.g., rotationally-fixed, to a or the cardan shaft. For example, the cardan shaft is connected, rotationally-fixed, at its side facing away from the first shaft, to a second cardan joint, such that at its side facing away from the cardan shaft is connected rotationally-fixed by a coupling, e.g., a rigid coupling, to the drive shaft of the generator unit, e.g., of the second gearbox of the generator unit. Thus, the transverse deflections of the first shaft caused by the force can be compensated via the cardan joint, so that the generator unit can be driven unchanged.

According to example embodiments, the first gearbox is connected to an expansion tank such that the inner space of the first gearbox is filled, e.g., completely, with oil and thermally caused expansions of the oil in the inner space can be received in the expansion tank. Thus, the gearbox is completely filled with oil, but no change in pressure relative to the surroundings can be effected when there is a change in temperature. Thus, shaft seals of the first gearbox are protected against overpressure.

According to example embodiments, the expansion tank has an inner space formed from two subregions separated from one another by a membrane. A first of the subregions is connected to the inner space of the first gearbox with an oil line, and the second of the subregions is connected to the surroundings. For example, the first subregion together with the inner space of the first gearbox is completely filled with oil. For example, the inner space of the expansion tank, e.g., the membrane, is arranged higher in the direction of gravity than the inner space of the first gearbox. Thus, the membrane is flexible, and the expansion of the oil through a modified surface can be effected without a significant increase in pressure. The membrane is positioned, at least in part, against the modified surfaces.

According to example embodiments, a further axial bearing, e.g., a thrust bearing, is received in the housing of the first gearbox, and the output shaft of the first gearbox is rotationally mounted by the further axial bearing. The rotational axis of the output shaft is oriented horizontally, e.g., perpendicular to the direction of gravity. Thus, a force introduced into the gearbox via the output shaft can be compensated. Thus, the smooth functioning of the first gearbox can be checked by the force introduced via the first axial bearing.

According to example embodiments, the output shaft of the first gearbox is rotationally mounted not only via the further axial bearing, but also via two further bearings received in the housing of the first gearbox. For example, each of the two further bearings received in the housing of the first gearbox is arranged as a twin row bearing. Thus, the output shaft is rotationally mounted via the two further bearings, and a high force load can be received via the further axial bearing. Thus, it is possible to provide reliable and robust functioning.

According to example embodiments, the drive is arranged on a flat base surface of an industrial plant, and the rotational axis of the output shaft is oriented perpendicular to the normal of the plane receiving the base surface. Thus, the first gearbox is provided with a vertically oriented output shaft for an application, e.g., for a stirrer or in a mixer, but is oriented horizontally for testing the output shaft.

According to example embodiments, the axial bearing can be subjected to a force, e.g., a force oriented perpendicular to the force effected by the first linear actuator, by at least one controllable second linear actuator. Thus, as an overlaying of the two forces generated by the two linear actuators, a resulting force can be introduced into the first shaft, and the direction of the resulting force includes a non-vanishing angle to the horizontal direction and also to the vertical direction.

According to example embodiments, the axial bearing can be subjected to a force by at least one controllable third linear actuator, e.g., a force oriented perpendicular to the force effected by the first linear actuator and oriented perpendicular to the force effected by the third linear actuator. Thus, an axial component can be overlayed on the radial component generated by the first two linear actuators. Thus, a load as similar as possible to the real load in the application can be applied.

According to example embodiments, the first linear actuator can be controlled by a control with a time-variable first control signal, e.g., a periodically variable first control signal. The second linear actuator can be controlled by a control with a time-variable second control signal, e.g., a periodically variable second control signal. For example, the first and second control signals have the same frequency and have a 90° phase offset relative to one another. Thus, a radially oriented force that occurs during stirring can be simulated. The direction of the force vector is circumferential. For example, the rotational speed of the output shaft is selected for the frequency. This is because a circumferential load that later occurs in the stirrer in the application when the frictional forces are as small as possible can be simulated at exactly this frequency. However, in order to also simulate the load when stirring with non-negligible frictional forces, a slip, that is, a deviation between the frequency and the rotational speed of the output shaft of the first gearbox, can be selected. In this instance, the frequency and the rotational speed of the output shaft, for example, differ by a maximum of 40%. In this manner, the tilt of the electric motor driving the first gearbox, e.g., a three-phase asynchronous motor, is also adequately taken into account.

According to an example embodiment of the present invention, in a method for operating a drive that has an electric motor and a first gearbox that can be driven by the electric motor, an output shaft of the first gearbox is connected rotationally-fixed to a first shaft by a coupling, e.g., a rigid shaft coupling, the first shaft is mounted by an axial bearing, e.g., a single axial bearing, that can be subjected to a force by at least one controllable first linear actuator, and the axial bearing can be subjected to a further force by at least one controllable second linear actuator. The first linear actuator is controlled by a control with a time-variable first control signal, e.g., a periodically variable first control signal, and the second linear actuator is controlled by the control with a time-variable second control signal, e.g., a periodically variable second control signal. For example, the first and second control signals have the same frequency and have a 90° phase offset relative to one another, and, for example, the rotational speed of the output shaft equals the frequency. Thus, the load when employing the first gearbox in a stirrer can be simulated.

Alternatively, the first and second control signals have the same frequency, but the rotational speed of the output shaft differs from the frequency, e.g., by up to 40%. In this manner, stirring with friction can be simulated and the testing can be carried out accordingly.

According to example embodiments, the first gearbox of the drive is removed and then connected to a further electric motor, and the direction of the rotational axis of the output shaft is oriented perpendicular to the initial direction of the rotational axis of the output shaft. For example, the output shaft of the first gearbox is rotated 90°, e.g., in the vertical direction, that is, for example, parallel to the direction of gravity. Thus, the testing of the first gearbox occurs rotated by 90°, and the first gearbox provided for a mixer or stirrer application can be tested with an arrangement can be constructed rapidly and readily.

According to example embodiments, the inner space of the first gearbox is completely filled with oil and, subsequently, the inner space of the first gearbox is only partially filled with oil, e.g., is not completely filled with oil, e.g., the further axial bearing and the two further bearings received in the housing of the first gearbox are arranged at least in part below the oil level. Thus, during the testing, which is executed rotated by 90°, the regions to be wetted with oil in the application are nevertheless wetted with oil. However, for this purpose, the first gearbox is completely filled with oil during the testing and an expansion tank, which is not required in the application, is connected.

Further features and aspects of example embodiments of the present invention are explained in greater detail below with reference to the appended schematic FIGURE.

BRIEF DESCRIPTION OF THE DRAWING

FIG. 1 schematically illustrates a test stand for introducing transverse force into the output shaft of a gearbox.

DETAILED DESCRIPTION

An electric motor 1 of the test stand drives a test specimen 2, e.g., a gearbox. To this end, the rotor shaft of the electric motor 1 is connected to the drive shaft of the test specimen 2 arranged as a gearbox.

The housing of the test specimen 1 and the housing of the electric motor 1 are connected to the base 14 of the industrial plant in which the test stand is arranged.

Toothed parts having rotationally mounted shafts are arranged in the inner space surrounded by the housing of the test specimen 1 and are surrounded by oil, e.g., lubricating oil. Since the gearbox used as test specimen 1 is provided for applications in which the output shaft is oriented vertically, for example, is provided for as mixer gearbox, and in the application at least partial filling of the inner space with oil is provided, the gearbox is completely filled with oil for the testing on the test stand. This ensures that all regions to be wetted with oil in the application are also wetted with oil on the test stand during the testing. An expansion tank 3 is connected to the gearbox so that, in the event of thermal expansion of the oil, the oil can flow into and/or out of a volume, e.g., limited by a diaphragm 20. To this end, the inner space of the gearbox is connected to the inner space 21 of the expansion tank 3, and the part of the inner space 22 of the expansion tank 3 not filled with oil is connected to the surroundings. The expansion tank 3 is arranged higher than the gearbox, at least in part.

The output shaft of the gearbox is connected by a first coupling 5, e.g., a rigid shaft coupling, to a first shaft 4 arranged rotationally mounted via at least one axial bearing 6.

The axial bearing 6 has an inner ring, rolling elements, and an outer ring. The inner ring is placed over the first shaft 4. The inner ring is, for example, connected to the first shaft 4 in a non-positive fit, e.g., by a snug fit.

The outer ring is movable by a first linear actuator 15, e.g., by a hydraulic actuator, transverse to the rotational axis of the first shaft 4, that is, also transverse to the rotational axis 30 of the output shaft of the gearbox. The first linear actuator 15 is supported on the base 14.

Thus, by the first linear actuator 15, the first shaft 4 and therefore also the output shaft of the gearbox can be subjected to a transverse force that is oriented perpendicular to the direction of the rotational axis of the first shaft 4 and of the output shaft of the gearbox.

By modulated operation of the linear actuator 15, a corresponding time-dependent transverse force can be generated. In this manner, a periodic load can, for example, be introduced during the rotational movement of the output shaft.

A second coupling 7, e.g., a rigid shaft coupling, is arranged at the end region of the first shaft 4 facing away from the gearbox, to which coupling a cardan joint 8 is connected, so that the torque supplied by the output shaft of the gearbox 2 is fed to a cardan shaft 9, which is connected to a generator 13 connected to a gearbox 12 via a further cardan joint 10 arranged on its side facing away from the gearbox, with a further coupling 11, e.g., with a further rigid shaft coupling.

Thus, transverse deflections of the first shaft 4 can also be compensated by the cardan joints 8, 10.

According to exemplary embodiments, a second linear actuator 32 is arranged supported on the base and also presses on the outer ring of the axial bearing, the direction of the transverse force being applied, e.g., perpendicular or at least at an angle of more than 50° to the effective direction of the first linear actuator 15.

Thus, with suitable modulation, e.g., 90° phase-shifted periodic modulation, of the two linear actuators 14, circularly circumferential transverse forces can also be generated.

Thus, the first linear actuator is, for example, subjected to a sinusoidal time-dependent control signal, and the second linear actuator to a cosinusoidal time-dependent control signal.

Such a periodically circulating load is suitable for simulating a load during stirring operation of a mixer.

According to exemplary embodiments, alternatively or in addition, a third linear actuator 34 is provided that loads the outer ring in the axial direction, that is, parallel to the direction of the rotational axis 30 of the output shaft. Thus, an axial force, e.g., a modulated axial force, can also be simulated.

As noted above, according to example embodiments, a further axial bearing 24, e.g., a thrust bearing, is received in the housing of the first gearbox 2, and the output shaft of the first gearbox is rotationally mounted by the further axial bearing 24. The rotational axis 30 of the output shaft is oriented horizontally, e.g., perpendicular to the direction of gravity.

As further noted above, according to example embodiments, the output shaft of the first gearbox is rotationally mounted not only via the further axial bearing 24, but also via two further bearings 26, 28 received in the housing of the first gearbox 2. For example, as schematically illustrated in FIG. 1, each of the two further bearings 26, 28 received in the housing of the first gearbox is arranged as a twin row bearing.

The invention claimed is:

1. A drive, comprising:

a first gearbox; and an electric motor adapted to drive the first gearbox, the first gearbox including an output shaft of the first gearbox connected rotatably-fixed to a first shaft by a coupling, the first shaft being mounted by an axial bearing adapted to be subjected to a force by at least one controllable first linear actuator;

wherein the axial bearing is adapted to be subjected to a force by at least one controllable second linear actuator;

wherein the first linear actuator is adapted to be controlled by a control device with a time-variable first control signal, and/or a periodically variable first control signal, the second linear actuator is adapted to be controlled by the control device with a time-variable second control signal and/or a periodically variable second control signal; and wherein the first and second control signals have a same frequency and have a 90° phase offset relative to one another.

2. The drive according to claim 1, wherein the first gearbox is connected to an expansion tank, an inner space of the first gearbox being filled and/or completely filed with oil, thermally caused expansions of the oil in the inner space being receivable in the expansion tank; and wherein the expansion tank includes an inner space formed from two subregions separated from one another by a membrane, a first one of the subregions being connected to the inner space of the first gearbox with an oil line, a second one of the subregions being connected to the environment.

3. The drive according to claim 2, wherein the first subregion and the inner space of the first gearbox is completely filled with oil, and the inner space of the expansion tank and/or the membrane is arranged higher in a direction of gravity than the inner space of the first gearbox.

4. The drive according to claim 1, wherein the coupling is arranged as a rigid coupling, and the axial bearing is arranged as a single axial bearing.

5. The drive according to claim 1, wherein the first shaft is connected and/or rotationally-fixedly connected to a generator unit via a cardan shaft and/or by cardan joints.

6. The drive according to claim 5, wherein the generator unit includes a generator adapted to be driven by a second gearbox.

7. The drive according to claim 1, wherein the first shaft is connected and/or rotationally-fixedly connected at an end region facing away from the first gearbox, via a coupling and/or a rigid coupling, to a first cardan joint that at a side facing way from the first shaft is connected and/or rotationally-fixedly connected to a cardan shaft, the cardan shaft being connected and/or rotationally-fixedly connected at a side facing away from the first shaft to a second cardan joint, so that at a side facing away from the cardan shaft is rotatably-fixedly connected by a coupling and/or a rigid coupling to a drive shaft of a generator unit and/or of a second gearbox of the generator unit.

8. The drive according to claim 1, wherein a further axial bearing and/or a thrust bearing is arranged in a housing of the first gearbox, and the output shaft of the first gearbox is rotationally mounted by the further axial bearing and/or the thrust bearing, a rotational axis of the output shaft being oriented horizontally and/or perpendicular to a direction of gravity.

9. The drive according to claim 8, wherein the output shaft of the first gearbox is rotationally mounted by two additional bearings arranged in the housing of the first gearbox.

10. The drive according to claim 9, wherein each of the two additional bearings is arranged as a twin row bearing.

11. The drive according to claim 1, wherein the drive is arranged on a flat base surface of an industrial plant, and a rotational axis of the output shaft is oriented perpendicular to a normal of a plane of the base surface.

12. The drive according to claim 1, wherein the first gearbox is connected to an expansion tank, an inner space of the first gearbox being filled and/or completely filed with oil, thermally caused expansions of the oil in the inner space being receivable in the expansion tank.

13. The drive according to claim 1, wherein the force by the second linear actuator is oriented perpendicular to the force by the first linear actuator.

14. The drive according to claim 1, wherein the axial bearing is adapted to be subjected to an axially oriented force by at least one controllable third linear actuator and/or the axial bearing is adapted to be subjected to a force oriented perpendicular to the force by the first linear actuator, perpendicular to the force by the second linear actuator, and in an axial direction, by at least one controllable third linear actuator.

15. The drive according to claim 1, wherein the first linear actuator is adapted to be controlled by the control device with the time-variable first control signal and the periodically variable first control signal, the second linear actuator is adapted to be controlled by the control device with the time-variable second control signal and the periodically variable second control signal.

16. A method for operating the drive recited in claim 1, the axial bearing adapted to be subjected to a further force by at least one controllable second linear actuator, comprising:

controlling the first linear actuator by a control device with a time-variable first control signal and/or a periodically variable first control signal; and controlling the second linear actuator by the control device with a second time-variable second control signal and/or a periodically variable second control signal.

17. The method according to claim 16, wherein the first and second control signals have a same frequency.

18. The method according to claim 16, wherein the first and second control signals have a same frequency, a rotational speed of the output shaft differs from the frequency.

19. The method according to claim 18, wherein the rotational speed of the output shaft differs from the frequency by less than 40%.

20. The method according to claim 16, further comprising, after the controllings:

removing the first gearbox of the drive, connecting the first gearbox to a further electric motor, and (a) orienting a direction of a rotational axis of the output shaft perpendicular to a direction of the rotational axis of the output shaft during the controllings and/or (b) rotating the output shaft of the first gearbox 90°, in a vertical direction, and/or parallel to a direction of gravity.

21. The method according to claim 16, wherein, during the controllings, an inner space of the first gearbox is completely filled with oil, and, during the removing, the connecting, and the (a) orienting and/or (b) rotating, the inner space of the first gearbox is only partially filled with oil and/or is not completely filled with oil and/or a further axial bearing and two additional bearings arranged in a housing of the first gearbox are arranged at least in part below an oil level.

22. A method for operating a drive that includes a first gearbox and an electric motor adapted to drive the first gearbox, the first gearbox including an output shaft of the first gearbox connected rotatably-fixed to a first shaft by a coupling, the first shaft being mounted by an axial bearing adapted to be subjected to a force by at least one controllable first linear actuator, the axial bearing adapted to be subjected to a further force by at least one controllable second linear actuator, comprising:

controlling the first linear actuator by a control device with a time-variable first control signal and/or a periodically variable first control signal; and controlling the second linear actuator by the control device with a second time-variable second control signal and/or a periodically variable second control signal;

wherein the first and second control signals have a same frequency; and wherein the first control signal has a phase offset and/or a 90° phase offset relative to the second control signal and/or a rotational speed of the output shaft equals the frequency.

23. A method for operating a drive that includes a first gearbox and an electric motor adapted to drive the first gearbox, the first gearbox including an output shaft of the first gearbox connected rotatably-fixed to a first shaft by a coupling, the first shaft being mounted by an axial bearing adapted to be subjected to a force by at least one controllable first linear actuator, the axial bearing adapted to be subjected to a further force by at least one controllable second linear actuator, comprising:

controlling the first linear actuator by a control device with a time-variable first control signal and/or a periodically variable first control signal; and controlling the second linear actuator by the control device with a second time-variable second control signal and/or a periodically variable second control signal;

wherein the first and second control signals have a same frequency, a rotational speed of the output shaft differs from the frequency; and wherein the first control signal has a phase offset and/or a 90° phase offset relative to the second control signal.

* * * * *